United States Patent
Picard

[15] 3,693,000
[45] Sept. 19, 1972

[54] LIGHT PROJECTORS

[72] Inventor: Claude Andre Picard, Paris, France

[73] Assignee: Tissmetal Lionel-Dupont, Lyon, Rhone, France

[22] Filed: Dec. 3, 1971

[21] Appl. No.: 204,561

[30] Foreign Application Priority Data

Dec. 7, 1970   France.....................7043859

[52] U.S. Cl. ...............240/41.6, 240/41.5, 240/44, 240/61.6
[51] Int. Cl. ..............................................F21v 7/00
[58] Field of Search..........240/41.6, 61.6, 41.5, 11.2, 240/44

[56] References Cited

UNITED STATES PATENTS

| | | | |
|---|---|---|---|
| 1,895,906 | 1/1933 | Arbuckle | 240/41.6 |
| 1,963,608 | 6/1934 | Baker | 240/41.6 X |
| 3,385,546 | 5/1968 | Scowen | 240/41.6 X |

Primary Examiner—John M. Horan
Assistant Examiner—E. M. Berd
Attorney—Stevens, Davis, Miller & Mosher

[57] ABSTRACT

A light projector which projects a beam of light inclined to the projector axis, comprising a hemispherical base containing an angularly adjustable lamp unit, and a glass with prismatic ridges which further deflects the inclined beam from the lamp unit.

6 Claims, 2 Drawing Figures

LIGHT PROJECTORS

The present invention relates to light projectors.

It is an object of the invention to provide a simple light projector capable of emitting a light beam that is oblique to the perpendicular to its seating plane, the obliquity of the beam being variable within wide limits according to the requirements of the various particular cases of application.

According to the invention, a light projector comprises a casing with a substantially hemispherical base in which an optical assembly is mounted by means of a circular annular plate secured in the base of the casing in a position inclined to the axis thereof, the casing being closed by a glass having prismatic ridges which are parallel and disposed in the same direction to deflect the beam as it passes through the glass.

The term "glass" is used herein to include also glass-like synthetic plastics usable for light-transmitting purposes.

By appropriate selection of the inclination of the optical assembly and of the angle of deflection produced by the ridges, the obliquity of the beam in relation to the perpendicular to the seating area of the projector can be varied.

By adjusting the optical assembly in relation to the annular plate, the angle of obliquity can be adjusted.

The projector may be mounted in a simple circular opening in a flat panel or the like, the axis of the casing being perpendicular to the plane of the panel, and the front of the projection being flush with the panel.

Figure 1:
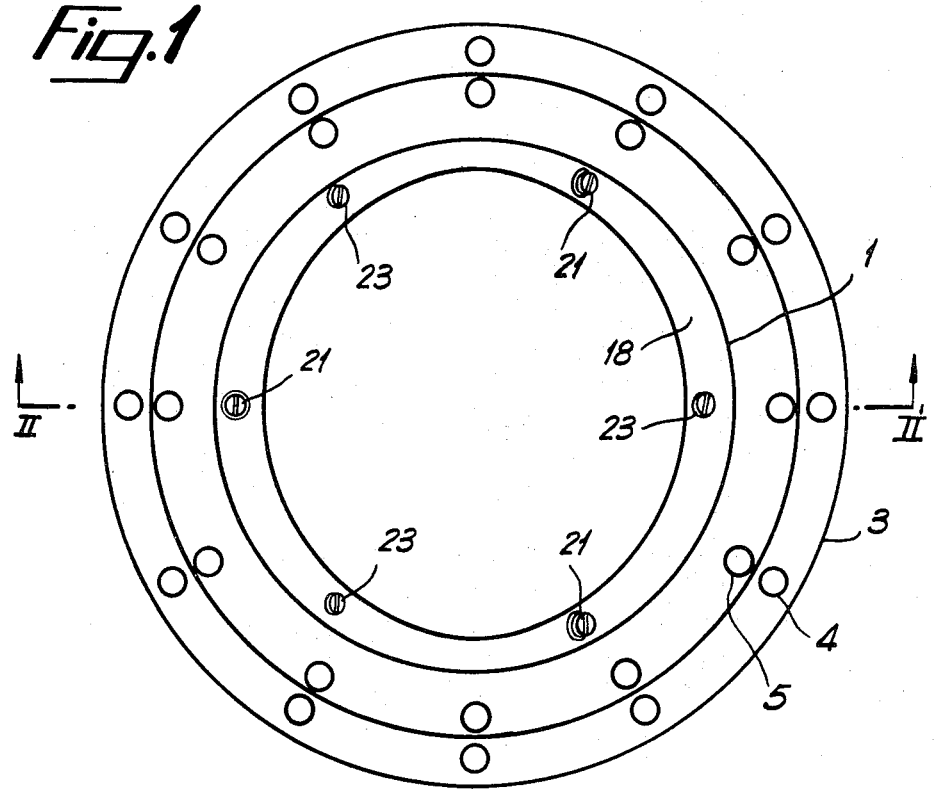
Figure 2:
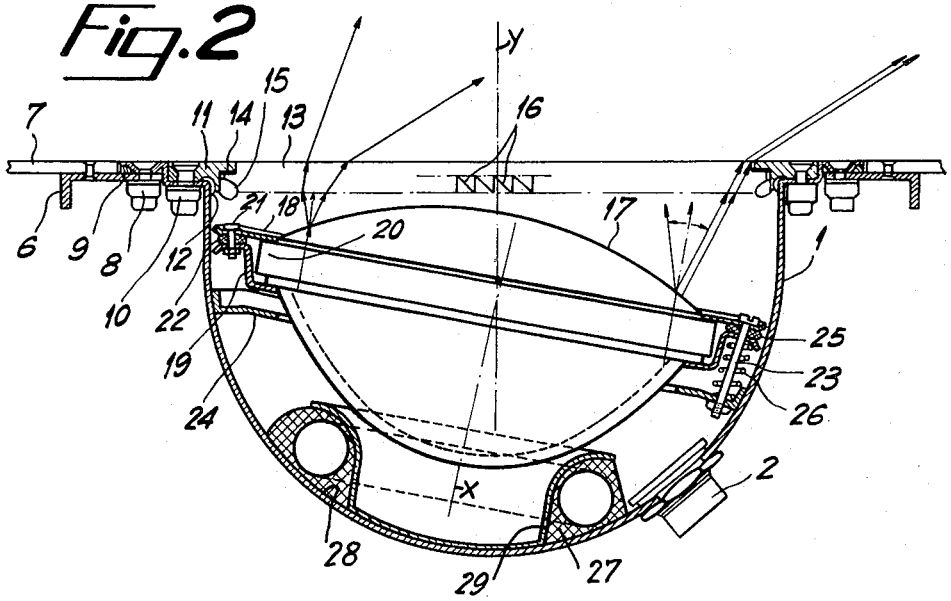

An embodiment of the invention will now be described by way of example with reference to the accompanying drawings, in which:

FIG. 1 is a front view of the casing of a light projector embodying the invention, without its glass; and FIG. 2 is a cross-section of the complete light projector, taken along line II—II of FIG. 1.

In the embodiment illustrated, the light projector comprises a casing 1 having a hemispherical base merging into a circular cylinder of constant height and having, therefore, a circular opening.

In the base there is an aperture fitted with a liquid-tight cable grommet 2 through which passes an electric cable (not shown) to supply the light projector with electric current, for example at 115 V, 400 Hz.

The opening of the casing is surrounded by an integral stepped flange 3 perforated with holes 4 and 5 (FIG. 1).

The holes 4, in the outer stepped portion of the flange 3, are used to fix the casing onto its support (for example a circular ring 6 rivetted to a lining panel 7 of an aircraft) by means of bolts 8. Between this flange portion and the ring 6 there is a sealing gasket 9. The holes 5, in the inner stepped portion of the flange 3, receive bolts 10 for fixing a bezel ring 11 and a sealing gasket 12 (FIG. 2).

The bezel ring 11 has an L-section recess in its inner peripheral surface which engages with a complementary L-section recess in the outer peripheral surface of the glass 13, the latter being sealed to the bezel ring 11 by a layer 14 of heat-resistant and liquid-tight cement or other sealing agent. An additional sealing gasket 15 is provided between the glass 13 and the bezel ring 11.

The glass 13 has on its inner surface prismatic ridges 16 which are parallel and all disposed in the same direction.

The optical assembly of the light projector comprises a liquid-tight lamp unit 17 of the "sealed beam" type, constituting at the same time a reflector, a lamp and a glass or lens, and two rings 18 and 19 which enclose the annular bead or rim 20 of the unit 17. The rings 18 and 19 are clamped on either side of the bead or rim 20 by means of bolts 21 with the interposition of flexible washers 22. As FIG. 1 shows, three bolts 21, placed at 120° from one another, are used.

The optical assembly comprising the unit 17 and the rings 18 and 19 is mounted by means of three adjusting screws 23 — also located at 120° and interposed between the bolts 21 — on an annular plate 24 which is secured in the hemispherical base of the casing 1 obliquely to the axis of the casing, as the various particular cases require. Each adjusting screw 23 passes through aligned holes in the rings 18 and 19 and in the annular plate 24. Around each adjusting screw 23 there are flexible washers 25 between the rings 18 and 19, and a spring 26 interposed between the ring 19 and the plate 24.

This method of mounting makes it possible to tilt the optical assembly by a few degrees in all directions around the axis of the plate 24.

The hemispherical base of the casing lends itself particularly well to the mounting of a toroidal step-down transformer 27. This transformer is held in position by means of a layer 28 of an insulating adhesive composition, and a cup 29 with a flared rim and a spherical bottom of the same curvature as that of the base of the casing 1 welded to the latter. The transformer may reduce the supply voltage to, for example, 28 volts.

Owing to the inclination of the plate 24, the optical axis X of the optical assembly is inclined at a certain angle, for example of the order of 10°, to the axis Y of the casing. When the glass 13 has been removed the screws 23 afford a possibility of adjustment, for example of the order of 5°, of the axis X in relation to the axis Y.

The inclination of the optical assembly makes it possible to obtain a beam of substantial obliquity without requiring the employment of very sharp prisms. These prisms are orientated in such a way that the deflection they impart to the light rays adds to the obliquity which the rays already possess as a consequence of the inclination of the axis X with respect to the axis Y of the casing. The latter is substantially perpendicular to the panel 7 in which the light projector is mounted.

As the arrows drawn on FIG. 2 show, the inclination of the beam in relation to the axis Y may be substantial. It may reach and even exceed 45°.

The present invention may be applied to light projectors intended for many purposes. It is of particular interest for projectors used in aircraft, making it possible in particular to avoid excessive cut-outs or projections or recesses.

Modifications may be made to the embodiment described, in particular by substituting equivalent technical means.

What we claim as our invention and desire to secure by Letters Patent is:

1. A light projector comprising a casing having a substantially hemispherical base and an opening opposite said base, means to secure said casing to a plane seating member with the axis or rotation of said base substantially perpendicular to the plane of said seating member and to said opening, a circular annular plate secured in said base obliquely with respect to said axis, a light beam projecting optical assembly, means mounting said optical assembly in said casing on said annular plate so that the optical axis of said assembly is generally perpendicular to said annular plate, and a light-transmitting element closing said opening, said light-transmitting element having prismatic ridges which are parallel and disposed in the same direction to deflect said light beam from said optical assembly as it passes through said light-transmitting element.

2. A light projector according to claim 1 in which said means mounting said optical assembly on said annular plate comprise adjusting screws whereby said optical assembly can be angularly adjusted relative to said annular plate.

3. A light projector according to claim 2 in which said optical assembly comprises two peripheral clamping rings, and said adjustable mounting means comprise adjusting screws which pass through said clamping rings and said annular plate.

4. A light projector according to claim 1 which also includes a bezel ring, means adhering said light-transmitting element to said bezel ring, sand means to secure said bezel ring to said casing around said opening thereof.

5. A light projector according to claim 1 which also includes a toroidal transformer and means securing said toroidal transformer in said base of said casing.

6. A light projector according to claim 1 in which said means to secure said casing to said seating member, said means defining said opening in said casing, and the outer surface of said light-transmitting element are all substantially coplanar.

* * * * *